June 10, 1930.　　　H. J. KROLL　　　1,762,822
FEEDING AND CUTTING DEVICE
Filed Nov. 27, 1925　　　4 Sheets-Sheet 1
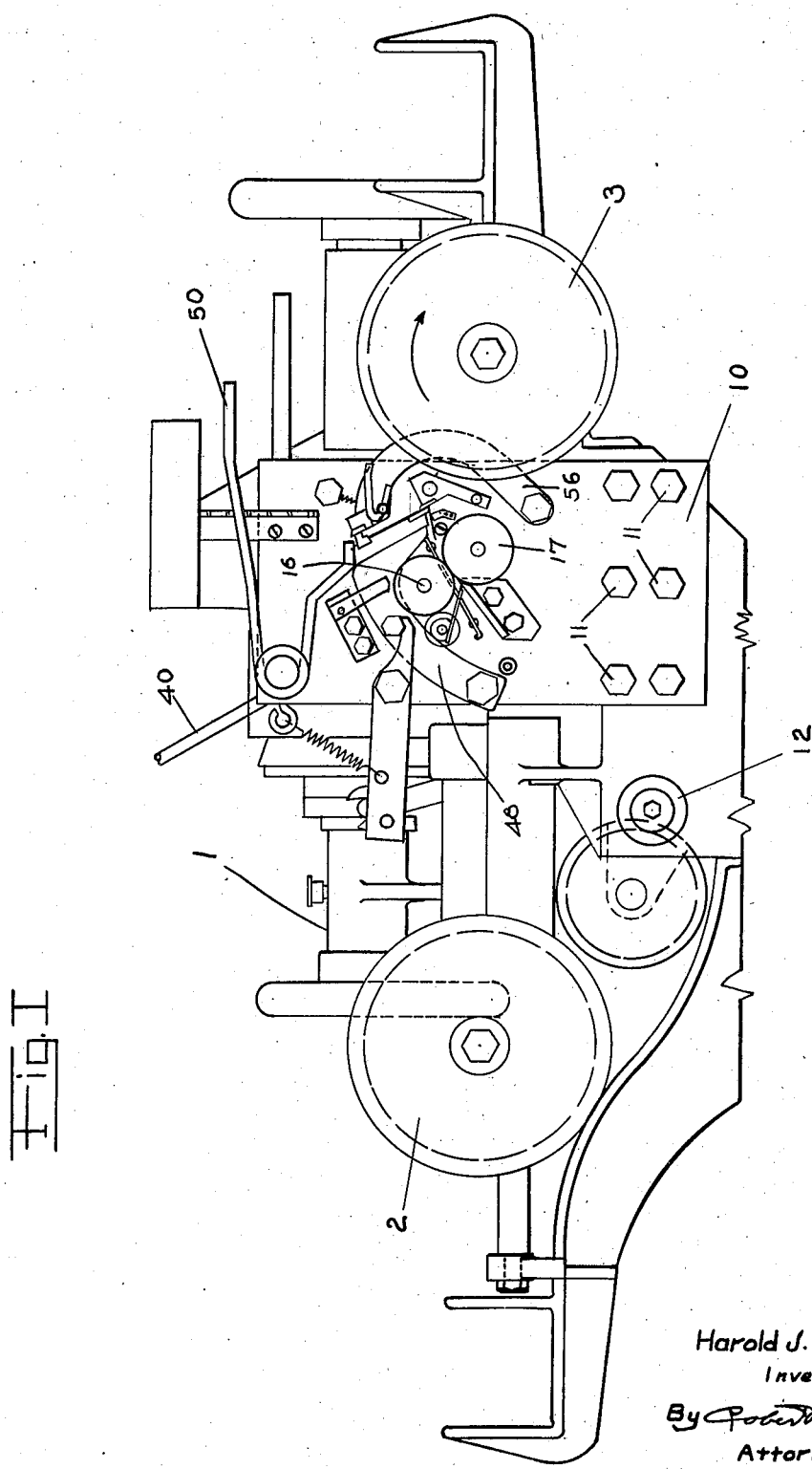
Harold J. Kroll
Inventor
By (signature)
Attorney

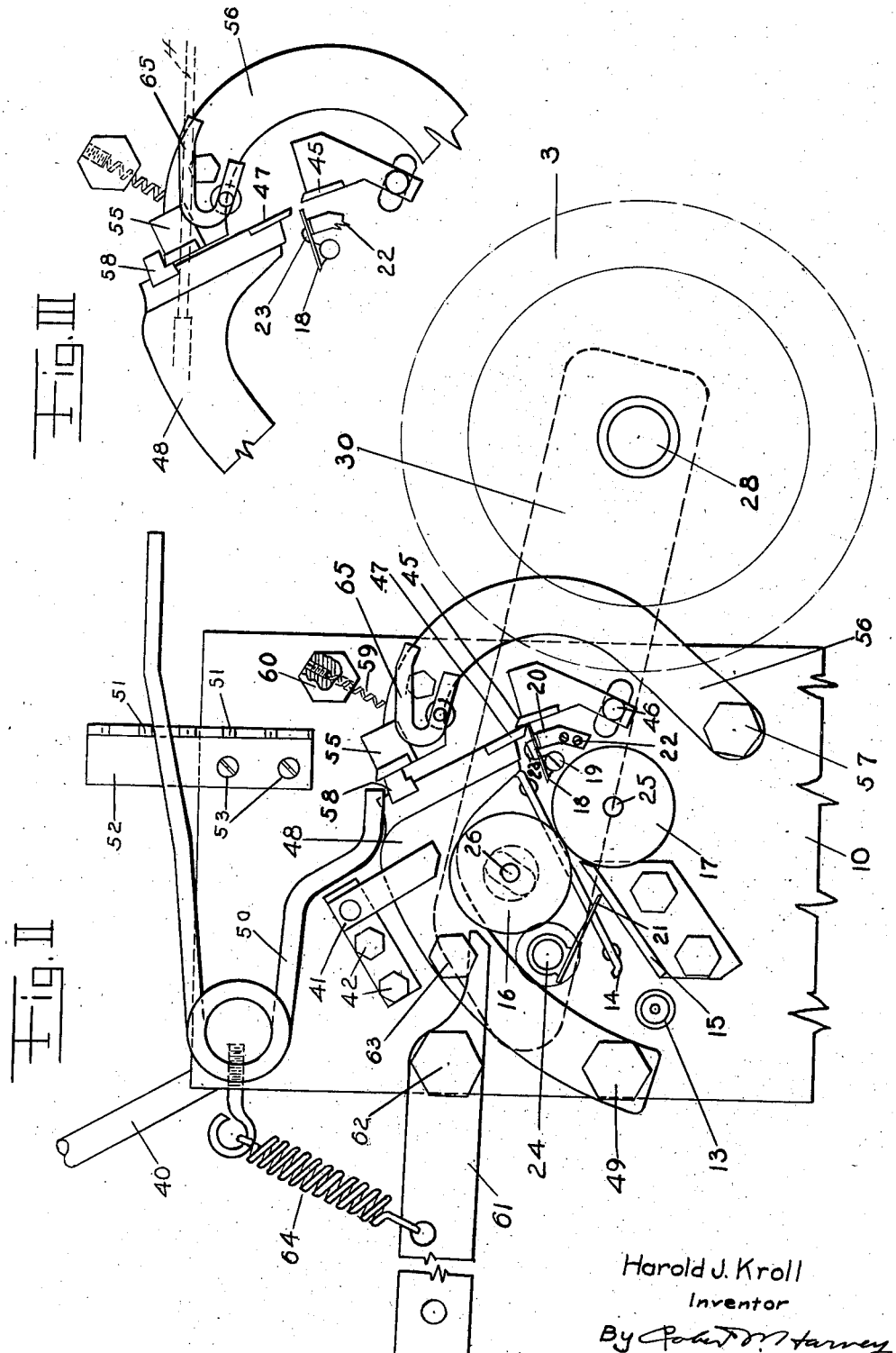

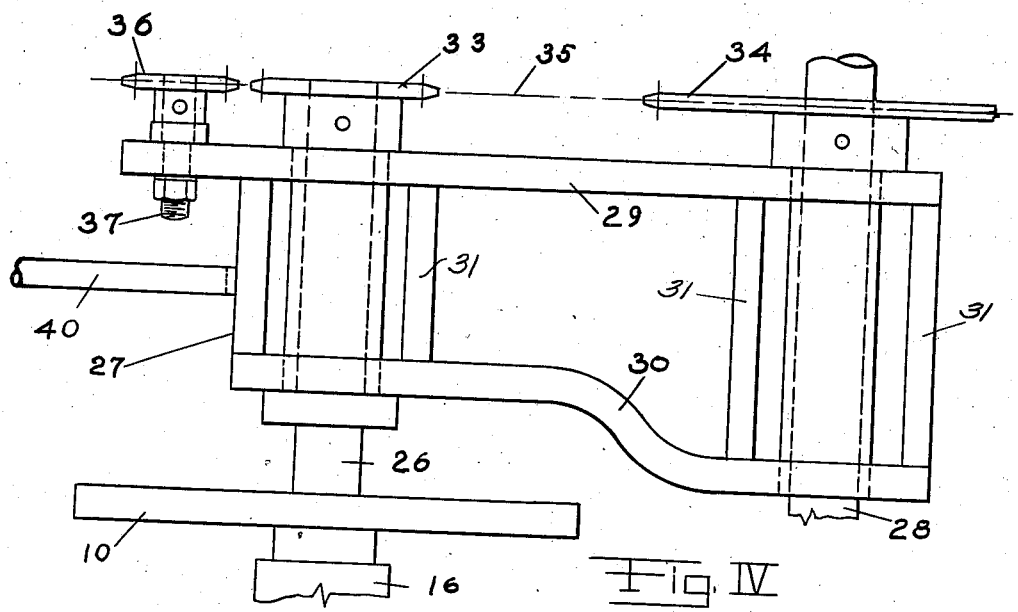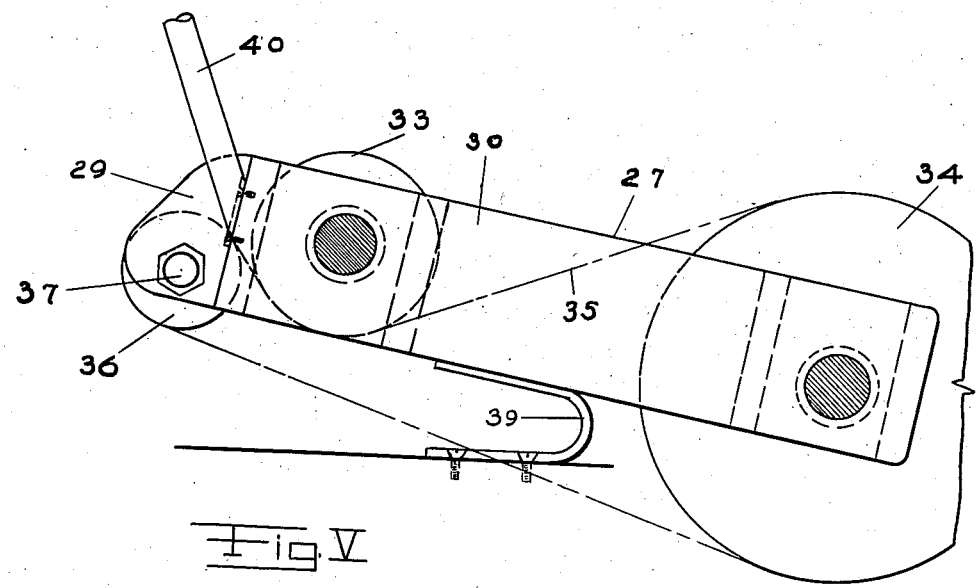

June 10, 1930.  H. J. KROLL  1,762,822
FEEDING AND CUTTING DEVICE
Filed Nov. 27, 1925  4 Sheets-Sheet 4
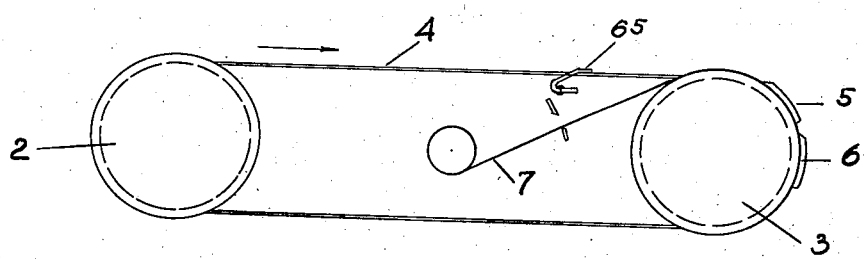
Fig. VI
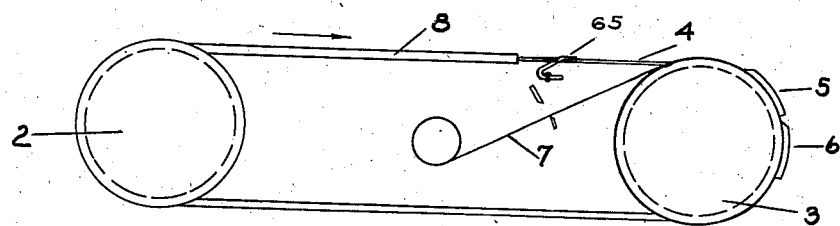
Fig. VII
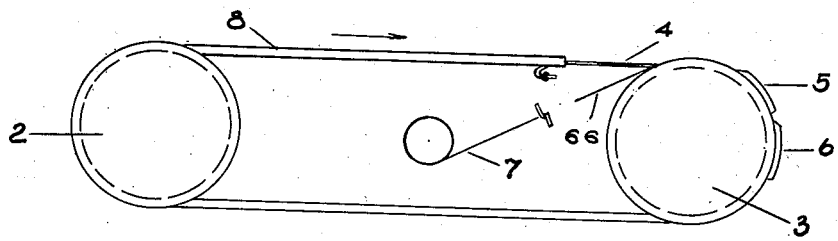
Fig. VIII
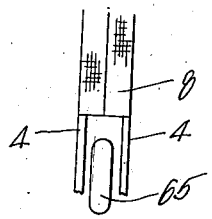
Fig. IX
Harold J. Kroll
Inventor
By (signature)
Attorney Patented June 10, 1930

1,762,822

UNITED STATES PATENT OFFICE

HAROLD J. KROLL, OF WAUWATOSA, WISCONSIN, ASSIGNOR TO THE FISK RUBBER COMPANY, OF CHICOPEE FALLS, MASSACHUSETTS, A CORPORATION OF MASSACHUSETTS

FEEDING AND CUTTING DEVICE

Application filed November 27, 1925. Serial No. 71,812.

My invention relates to automatic feed and cutting devices for strip material.

Among the objects of my invention are to provide means for automatically severing a web after an amount sufficient for a given purpose has passed the cutter, and to provide a device in the operation of which the hand of the operator at no time comes within danger from the cutter. Other and further objects will be apparent from the following specification and claims.

In the drawings which illustrate one embodiment of my invention:

Figure 1 is a front elevation of a double cable tire bead wrapping machine incorporating my invention, parts of the wrapping mechanism being omitted, Figure 2 is a view on an enlarged scale of the cutting mechanism shown in Figure 1, Figure 3 is a detail view showing the cutter in set or loaded position, Figure 4 is a plan view of the driving mechanism for the web feed, Figure 5 is a front view of the structure shown in Figure 4, and Figures 6, 7 and 8 are diagrammatic views showing the manner of operation, Figure 9 is a detail plan view showing the manner in which the wrapper engages the trip.

Referring to the drawings 1 designates generally a bead wrapping machine of the general type shown in the co-pending application of Daniel E. Hennessy, Serial Number 746,255, filed October 27, 1924. One common form of bead structure comprises annular coils of wire, or other suitable material, termed "grommets," about which is wrapped a strip of rubberized fabric, the whole forming a bead core for use in the construction of pneumatic tire casings. The specific structure of the wrapping mechanism forms no part of my invention and it will be sufficient here to note that the wrapping mechanism comprises grooved rolls 2 and 3 adapted to support wire or other bead grommets 4 in parallel relation, the roll 2 being movable toward roll 3 to facilitate positioning of the grommets and their removal after being wrapped and away from roll 3 to properly tension the grommets during the wrapping operation, roll 3 being driven in the direction of the arrow in Figure 1 to progressively advance the grommets and an associated strip of wrapping material. Suitable folding plows are associated with roll 3 which for the sake of clearness have been omitted from Figure 1, but are diagrammatically indicated at 5 and 6 in Figures 6, 7 and 8. As shown in the latter figures a strip of wrapping material 7 is fed into engagement between grommets 4 and roll 3, the grommets being positioned centrally of the strip, and on rotation of the latter is advanced with and folded around the grommets as shown at 8, the plows 5 and 6 operating to turn the edges of the wrapper strip over onto the grommets to completely enclose the latter. The improved web cutting mechanism of my invention is supported by a plate 10 secured by bolts 11 to the frame of the wrapping mechanism as shown in Figure 1. Secured to the frame adjacent the plate is a freely rotatable roll 12 adapted to receive a roll of wrapping material. The details of the cutting mechanism are best shown in Figures 2 and 3. The wrapping material from roll 12 passes under a guide roll 13, mounted on plate 10, between strip guides 14 and 15 suitably secured to plate 10, between feed rolls 16 and 17, later described, and over stripper plate 18 pivoted to plate 10 at 19 and urged upwardly by a spring 20 secured to plate 10 by screws 22. A stop 23 is provided to limit the upward movement of stripper 18. In the interest of clearness the wrapper strip has been omitted from Figures 1 and 2 but as will be evident from said figures stripper plate 18 functions to raise the end of the strip after the cutting operation to position it to be fed forward by feed rolls 16 and 17. Fingers 21 loosely pivoted on a stud 24 prevent rearward movement of the strip after it is severed. The roll 17 is mounted for free rotation on shaft 25 secured to plate 10, while roll 16 is positively driven and is adapted to be moved toward and from roll 17 to feed the roll forward as desired. To this end shaft 26 of roll 16 is rotatably mounted in a swinging frame 27 pivoted on shaft 28 of roll 3, see Figures 4 and 5. As shown frame 27 comprises side members 29 and 30 and spacing members 31. Shafts 26 and 28 are provided with sprockets 33 and 34 respectively and shaft 26 is continuously driven from shaft 28 by a sprocket chain 35 passing over sprocket 34 under sprocket 33 and around a sprocket 36 mounted on a stub shaft 37 secured in an extension of frame member 29. Frame 27 is urged upwardly by a spring 39, secured thereto and to the frame of the wrapping machine, to normally maintain rolls 16 and 17 separated. A handle 40 is secured to one of the members 31 by which the operator can move rolls 16 and 17 into operative relation as desired.

The cutting instrumentalities comprise a relatively stationary knife 45, adjustably secured to plate 10 by a bolt 46, and a movable knife 47 carried by arm 48 pivoted to plate 10 at 49. Arm 48 is guided in its movement by a finger 41 secured to plate 10 by bolts 42 and is urged into cutting engagement by spring 50 compressed between the arm 48 and one of a plurality of teeth 51 formed in an upright 52 secured to plate 10 by screws as at 53. The spring load on arm 48 can be varied by changing the position of the upper end of spring 50 with respect to teeth 51 in an obvious manner. Arm 48 is adapted to be releasably locked in operative position against spring 50 by a lug 55, secured to an arm 56 pivoted at 57 to plate 10, which lug, when arm 48 is raised as shown in Figure 3, engages a lug 58 formed on arm 48. Arm 56 is urged into locking position by compression spring 59 seating in a bolt head 60. Arm 48 is raised to locking position by a lever 61, pivoted at 62 to plate 10. One end of lever 61 engages a bolt 63 set in arm 48, the other end being conveniently connected to a foot treadle not shown. The weight of lever 61 and the treadle, if used, may be compensated by a light spring 64. A trip 65 for releasing the knife 47 is secured to arm 56.

The operation is as follows. With the knife locked in the position shown in Figure 3, handle 40 is depressed to bring driven roll 16 into operative relation with roll 17 to feed the strip of wrapper 7 into engagement between grommets 4 and driven roll 3. (See Figure 6). Handle 40 is then released and the strip is drawn forward by roll 3 and folded about the grommets by suitable folding mechanisms conventionally indicated at 5 and 6. The trip 65 is positioned in the path of the folded wrapper as shown in Figure 7. The advancing edge of the wrapper engages trip 65, rocks arm 56 about its pivot releasing lug 55 from lug 58 and permitting knife 47 to snap down under the influence of spring 50 to shear the strip of wrapper material 7, as shown in Figure 8, the end 66 of the strip being sufficient to complete the wrapping of the grommets. The machine may be now stopped and the wrapped grommet removed. Knife 47 is then returned to locked position by lever 61 and the machine is now ready for another cycle of operation.

I claim:

1. A device of the character described comprising normally closed cutting elements, means adapted to releasably hold said cutting elements in open relation and means automatically operable through contact with the advancing end of a web to release said holding means.

2. A device of the character described comprising normally closed cutting means, loading means adapted to urge said cutting elements to closed position, means adapted to releasably hold said cutting elements in open relation and means automatically operable through contact with the advancing end of the web to release said holding means to permit the cutting elements to close under the action of the loading means.

3. A device of the character described comprising normally closed cutting elements, means adapted to releasably hold said cutting elements in open relation, means to feed a strip of material between the open cutting elements and means automatically operable through contact with the advancing end of a web to release said holding means.

4. In a device for applying a wrapper to a flexible annular article including spaced pulleys for supporting the article; wrapper cutting means positioned intermediate the pulleys comprising a relatively stationary cutting blade, a movable blade, means urging the latter into cutting relation with the stationary blade, locking mechanism associated with the movable blade to releasably hold the latter separated from the stationary blade and means positioned in the path of the wrapped portion of the article to automatically release said locking mechanism.

5. In a device for applying a wrapper to a flexible annular article including spaced pulleys for supporting the article; wrapper cutting means positioned intermediate the pulleys comprising a relatively stationary cutting blade, a movable blade, means urging the latter into cutting relation with the stationary blade, locking mechanism associated with the movable blade to releasably hold the latter separated from the stationary blade and means positioned in the path of the wrapped portion of the article to automatically release said locking mechanism, said releasing means and said stationary blade being positioned substantially the same distance from the point of application of the wrapper to the article.

6. In a device for applying a wrapper to a flexible annular article including spaced pulleys for supporting the article; wrapper cutting mechanism positioned intermediate the pulleys comprising a spring actuated cutting means, means adapted to releasably lock said cutting means in inoperative position and means positioned in the path of the wrapped portion of the article to automatically release said cutting means.

7. In a device for applying a wrapper to a flexible annular article including spaced pulleys for supporting the article; wrapper cutting mechanism positioned intermediate the pulleys comprising a spring actuated cutting means, means adapted to releasably lock said cutting means in inoperative position and means positioned in the path of the wrapped portion of the article to automatically release said cutting means, said releasing means and cutting means being positioned substantially the same distance from the point of application of the wrapper to the article.

In testimony whereof I have signed my name to the above specification.

HAROLD J. KROLL.